July 31, 1962 — A. N. KNAUF — 3,047,457
PROCESS FOR PRODUCING CONSTRUCTION ELEMENTS OF ANY SHAPE
Filed Feb. 14, 1958 — 2 Sheets-Sheet 1

INVENTOR
ALFONS N. KNAUF

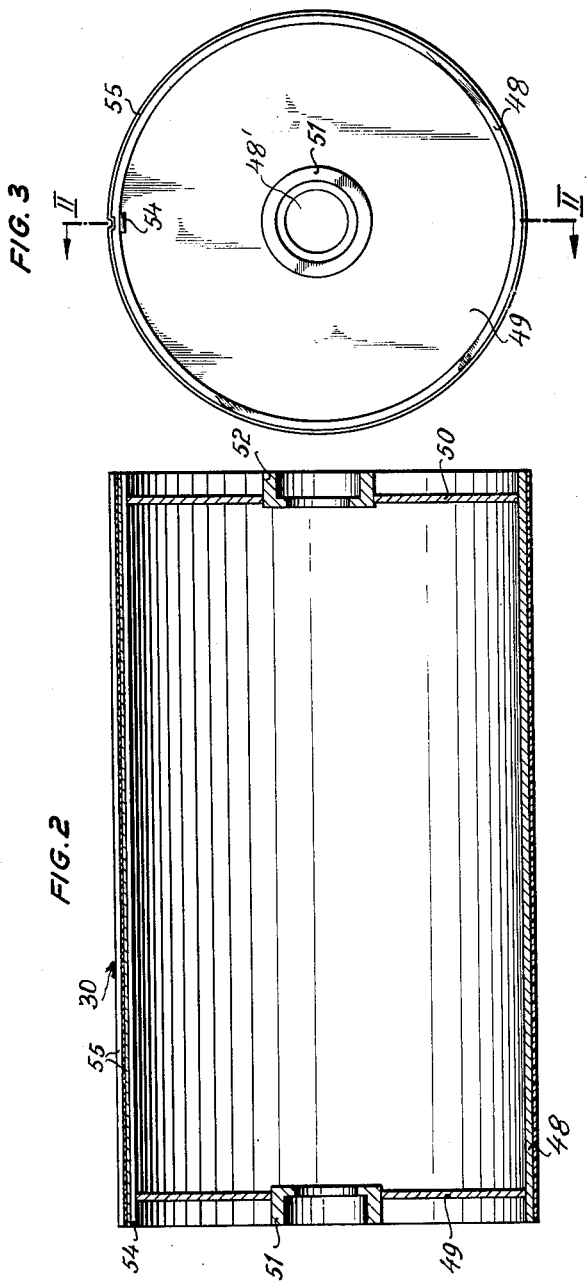
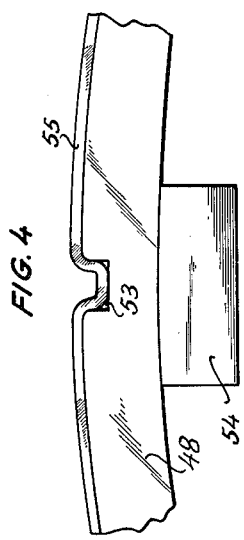

United States Patent Office 3,047,457
Patented July 31, 1962

3,047,457
PROCESS FOR PRODUCING CONSTRUCTION
ELEMENTS OF ANY SHAPE
Alfons N. Knauf, Beaumarais-Siersburg, Germany, assignor to Nikolaus Wilhelm Knauf, Saar County, Germany
Filed Feb. 14, 1958, Ser. No. 715,453
Claims priority, application Germany Feb. 14, 1957
13 Claims. (Cl. 162—174)

The present invention relates to a process and plant for producing building or like construction elements, boards, plates, etc.

It is one of the important features of the present invention to provide means facilitating the production of durable elements of the aforesaid type, which are relatively simple to manufacture at greatly reduced cost, through very efficient and speedy operation and with readily available fibre containing starting materials preferably from waste, which inherently lead to felted interlacing and compounding of the fibrous constituents thereof.

It is another object of the present invention to provide means affording the continuous formation of reticulated or interconnected fibrous starting materials having incorporated therein binder substance or substances in semi-liquid or slimy condition to thereby finally obtain strong and wear resistant building and plate-like elements.

Heretofore building plates from plaster of Paris for wall boards and other plates of any description were produced to which suitable fillers and flux aggregates were added to thereby obtain wall construction plates of predetermined dimensions and strength. Plaster of Paris was also employed to manufacture sound proof wall sections, filler plates and bases for heating plates etc. Furthermore combination cardboard and plaster of Paris plates were placed on the market, which, however, did not find full recognition and use.

During the manufacturing steps for the aforesaid plate-shaped bodies the slimy and semi-fluid plaster mass (with relatively reduced water content) is cast in metallic or wooden molds and then removed from the latter after suitable hardening and setting of the mass, whereby the same is subjected to a drying stage either through natural or artificial application of heat or the like, to attain desirable properties in strength.

The present invention distinguishes from these and other prior art developments in that continuous process is aspired, which employs a mass of fibrous materials the fiber constituents of which adhere to each other and produce a kind of felting effect, which materials are brought into a binder suspension derived from mineral and sulphatic substances with a considerable excess of water, whereby the resultant mass thus obtained is treated to assume a predetermined shape while the water excess is removed or separated out before setting and hardening of the mass takes place.

It is still another object of the present invention to provide means ensuring a controlled setting of the aforesaid mass by means of increased effects of plaster of Paris crystal seeds present in the water, whereby such effects may be influenced and regulated through retarders to a desirable maximum.

It is a further object of the invention to provide means affording a marked reduction in the loss of starting materials and the avoidance of plaster crystals at undesirable and unsuitable locations of the mass, so that disturbances in the performance of the continuous manufacturing process will be eliminated.

Yet a further object of the present invention resides in the provision of means conducive to the re-use of excess or separated out water constituent which together with crystals of plaster of Paris will maintain the time of setting of the mass of starting materials at a constant level or value during continuous production steps.

Still another object of the invention is to provide means redounding to the use of simple mixing and conveyor devices which do not need surveillance or maintenance during the continuous process steps, as any danger of premature setting of the mass in said devices may be effectively avoided.

It is another object of the present invention to provide means facilitating continuous production of panels, plates and similar elements by an inexpensive mass production method, whereby elements of the aforesaid type are obtained having great commercial value, strength and usefulness for a great variety of purposes.

Still another object of the present invention is to provide means contributing to the employment of plaster of Paris having a high water content which is reduced to a minimum at final shaping stage of the mass, so that the products obtained therefrom are of particular hardness, firmness and strength as they are substantially free from any air and gas inclusions.

It is yet another object of the invention to provide means accelerating the drying of said products, as only a minimum water content remains in the latter, so that the period of time for carrying out the drying stage is markedly shortened (to a few hours) as compared with the manufacture of cement plates or slabs which require about three to four weeks to set and harden.

Still a further object of the present invention is to provide means permitting the employment of fibrous waste materials in the production of plaster elements with pre-controlled time of setting and permitting imparting to said fibrous plaster elements any suitable forms, such as pipes, pipe sections, fittings, panels and like shapes in the course of a continuous manufacturing process, thereby materially reducing the cost of manufacture and enhancing the saleable and commercial possibilities of the products obtained from such process.

Yet a further object of the present invention is to provide means manifesting a very efficient plant for the aforesaid production of plaster elements with intertwined fibrous constituents which partly takes advantage of heretofore existing processing devices, but also includes novel shaping and drying equipment without inordinately increasing the cost for the erection of such plant, which, if desired, may be arranged in the proximity of the site, where such elements are to be ultimately used.

It is still a further object of the present invention to provide a plant which minimizes the handling of the starting materials and their further processing, since the plant works substantially automatically and enables the attainment of highly valued products of the aforesaid type, which are substantially fireproof, have reduced heat transmission characteristics, substantially avoid any sweating or deposits of condensation water and remain to a certain degree elastic due to the interconnection of the plaster crystals uniformly achieved throughout the entire cross-section of the final product.

It is still another object of this invention to provide means for obtaining any desirable change of the properties of the final product by suitably modifying the mixture of the binder or binder derivatives, while substantially avoiding shrinkage of the finally resultant elements.

These and other objects of the invention will become further apparent from the following detailed description, reference being made to the accompanying drawings showing preferred embodiments of the invention.

FIG. 2 is a sectional view taken along the plane of line II—II of FIG. 3;

FIG. 3 is an end view of a drum utilized in the apparatus shown in FIG. 1; and

FIG. 4 is a fragmentary detail view, drawn on an enlarged scale, of the drum shown in FIG. 3.

Figure 1:
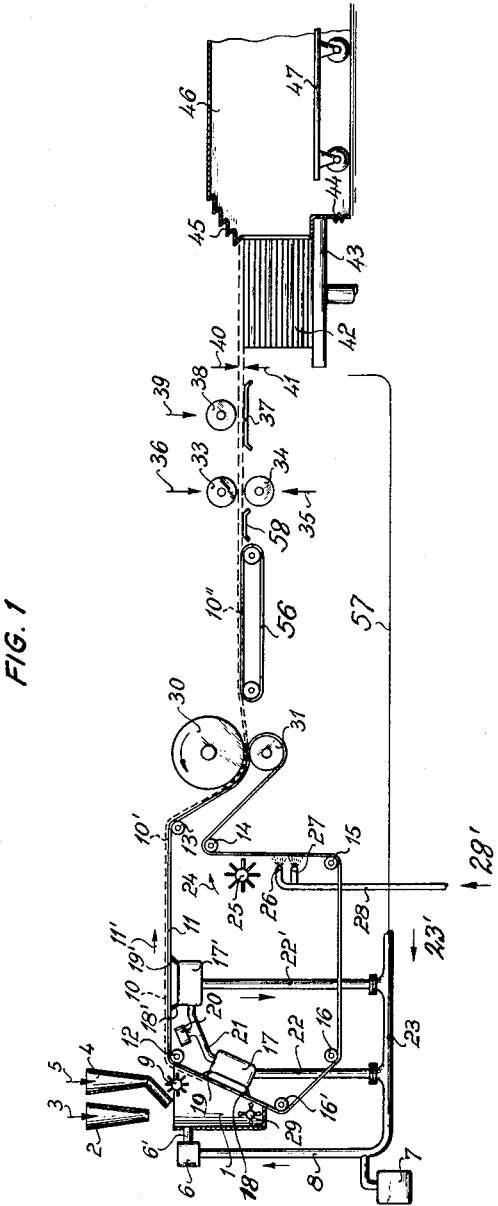
FIG. 1 is a schematic representation of a production plant or apparatus pursuant to the present invention.

Methods for producing building materials, such as panels, formed of a fibrous material and an aqueous binder, such as cement, are well known in the prior art. Such methods may provide for the continuous production of an aqueous sludge or slime comprising fibrous material and cement, which sludge is spread, formed and pressed upon an endless support or belt which is continuously moving and which is subjected to suction to remove the water from the sludge or like mixture. It is also known to apply pressure to the self forming felt-like sheet material formed of the fibrous material and cement by means of a rotary drum which can be reciprocated along the surface of the sheet material.

In addition, it is known to utilize a porous belt, such as a belt formed of cotton or metal mesh, and to locate vacuum or suction heads below the belt. Furthermore, it is known to clean the belt by means of a striker device or by spraying with water and to let the removed water return to a mixing tank in which the sludge or mash is formed.

Prior to the present invention, it was not possible to utilize non-aqueous binders, such as plaster, so that building materials formed of plaster of Paris had to be cast or shaped in molds. Such plaster building materials took many different forms. In utilizing the molds, the plaster mixture or sludge flowed into wooden or metal molds in a more or less fluid state and after hardening the molds were removed and the cast was dried. It was also known to use supplementary machines in connection with the molds.

It was also known in the prior art to use stucco-plaster which entailed the use of only little water to add to the strength of the resultant material. A sludge containing proper proportions of water and plaster was introduced into a flat pan lined with a high grade cardboard which served as a mold. This was the only known method for the mass production of thin elastic building materials utilizing plaster.

Pursuant to the present invention, a suspension having excess water is formed out of a material, which is adapted to interlace or intertwine, and mineral sulphurous binders, a preshaped felt-like layer material being then formed and the greater portion of the excess water being drained off before the start of the setting operation. Pursuant to one embodiment of the invention, ground material containing at least 10% of calcium sulphate is utilized as the mineral sulphurous binder.

One of the difficulties, which heretofore made impossible the production of plaster-fiber panels in a continuous process, is due to the fact that the excess water in the mixture contains plaster particles which act as crystallizing nuclei or "seeds." Since such nuclei would greatly accelerate the setting of the plaster sludge, the same water could not be re-used. The setting of the plaster is based upon the fact that plaster of Paris is more soluble than a dihydrate.

Plaster of Paris in a dissolved condition will become a dihydrate, of which only a small portion can remain dissolved, as the plaster of Paris was previously dissolved, so that the excess will deposit from solution in solid form. Consequently, since water is then again available to dissolve plaster of Paris, the cycle can repeat itself.

Also pursuant to the present invention, the speed-up in the setting of the plaster with water containing the crystallizing nuclei is controlled. One solution is to reduce the solubility of the plaster of Paris and a second solution is to reduce the speed of the dissolution of the plaster of Paris. Various substances which can create precipitations of plaster reduce the solubility and the speed of dissolution of plaster of Paris. The setting process can be delayed with the addition of such substances. Such substances may be, for example, ammonium carbonate, sodium phosphate, tannin, keratin, etc. These substances cause the single plaster particles to be provided with a coating of precipitation material. The speed of dissolution is thus reduced in proportion to an increase in the compactness and imperviousness of this coating. Keratin is especially effective for this purpose. By the addition of 2% of keratin, the solubility of plaster of Paris in water decreases from 0.885 g./100 cm.$^3$ to 0.678 g./100 cm.$^3$ and the speed of dissolution is decreased to such an extent that the setting process is extended from 32 minutes to 48 days.

The setting-acceleration effect of the plaster nuclei in the water increases only until a certain peak is attained, as delaying or retarding substances are added. Consequently, a condition of equilibrium is attained, and beyond this an increase of hardened plaster particles in the water will no longer increase the time of setting of the plaster batch. The quantities of plaster to be dissolved are normally very great. They amount to approximately 15% of the plaster requirement which, in the event that the excess water is not re-used, would result in a considerable loss of material which, through crystallization at unsuitable areas in the production plant or apparatus, can cause the breakdown thereof.

If the excess water is re-used, the crystals introduced in the water from previously set plaster will speed up, in a constantly accelerating rate, the setting of the plaster batch so that after some time the plaster batch is no longer workable and loses its cohesion. It has been found according to the invention that the addition of keratin containing substances, in liquid or soluble form, to the mixing water will reduce the solubility of the plaster to such an extent that the quantity of plaster going into solution, and the quantity of the crystallized plaster upon re-use of the water, are both very small.

Consequently there results a stabilizing balance between the acceleration effectiveness of the crystallized plaster and the retarding action of the keratin additive. This balance provides the possibility of regulating for a suitable time the setting effect, which will be constant during continuous operation.

For further improving the process of the present invention, there can be utilized sulphurous binders, preferably plaster, with a supplementary addition of a retarding substance to the mixing water, such as keratin products, in the amount of 0.1% to 1% of the weight of the binder. The high solubility of the calcium-sulphates, which prior to the present invention prevented their use, can be sufficiently reduced by the addition of a retarding substance, such as keratin products in the amount of 0.1% to 1% relative to the added amount of plaster. This will provide a desirable setting time for the production of the building material. Consequently, the retarding agent has the double function of reducing of the solubility of the individual plaster particles through membrance formation thereabout and to provide for a suitable setting time. The best results are achieved by dissolving the retarding agent in the mixing water before adding the plaster.

Suitable substances for the felting effect by interlacing on intertwining the starting materials are vegetable, animal, mineral and artificial fibrous material of every type, in addition to mixtures of dissimilar types of fibrous materials. Suitable vegetable fiber materials are, for example, cotton, turf, sisal and jute. It is preferable to use waste fibers from a spinning or textile mill. Suitable animal fibrous materials are, for example, wool, animal hair, leather waste. A suitable mineral fibrous material is slag wool and a suitable artificial fiber is nylon fiber.

Fiber materials are not the only substances adapted to provide a felt-like interlacing or interweaving material, but other sharp-edged, hairy or twisted particles may be used. Said particles may be formed by crushing or during the size reduction of waterproof and solid material, such as for example, the waste, chips or splinters produced by the cutting, machining or turning of plastic material, metal fillings or particles obtained in reducing the size of products formed of or containing fiber materials. For example, it is possible to use the soaked and crushed parts of used paper bags. In addition, there may be utilized wood fibers or a mixture of wood wool and wood shavings.

The surplus water is conveniently disposed of either by letting it flow out of a discharge base, by draining it off in known manner, or by squeezing it out, for example, with drums. The water used will be more than 8 to 16 times the weight of the binding material. The best results will be achieved by using 10 to 12 times the amount of such weight. The speed of setting is best regulated so that the setting, in the sense of a noticeable stiffening, starts after more than 10 minutes, up to 500 minutes, for example, after 120 to 300 minutes, and preferably after 120 to 180 minutes. The binding material can be replaced with clay in the amount up to ⅓ of the weight of the binder.

An apparatus for practicing the methods of the present invention comprises a mixer device, feed means, a porous conveyor belt, one or more suction devices attached to the belt, a drum to take up the felt-like sheet material formed upon the belt, at least one pressure device, and a device to stack and dry the panels formed by the apparatus. The apparatus has provision to return all water, including that removed from the material, to the mixing tank.

Provision may also be made to treat the upper surface of the felt-like sheet material produced by the apparatus, before the start of the setting, as for example, by applying a surface-layer thereto. Such treatment can consist of the color impregnation of the material or the securement of a color coating layer thereto. Special surface layers can be applied to the felt-like material, in the form of sheet material which can be printed and which may comprise a plastic foil, a metal foil or a veneer. The felt material surface can, in addition, be only partly covered in various patterns by such coating materials. In addition, liquid or semi-liquid substances can be applied to the felt-like material to color the latter.

In the event the apparatus has two pressure-applying stations, for example two roller-frames, it is advantageous to perform the surface-treating operation of the produced felt-material between the pressure-applying stations. In the first pressure-applying station, the felt-like material may be profiled to any desired form. The profiling can also be accomplished at the second pressure station or continued there. In addition, a second pressure-applying station has the advantage that, by a more extensive removal of the water and as a result of the additional compression of the felt-like material passing therethrough, the strength of the product will be increased and the final drying thereof will be made easier.

The surface treatment of the felt-like material can also produce a profile thereon, and the surface can be rolled so as to smooth the latter or to provide patterns thereon.

It is also advantageous to utilize more than one mixing tank for one apparatus so that one may be cleaned while the other is in use.

The use of a take-up or wind-up drum of the type used in the production of asbestos cement panels and in cardboard making machines provides the necessary large clearance and wall thickness for the final product. The felt-like substance upon the porous belt, through which the water draws, can be produced in various thicknesses. By winding the felt-like material in known manner, about the take-up drum, the thickness can be increased as desired.

It is advantageous to provide a brush which works on the outer face of the circumferential drum so as to continuously clean the portion of the drum surface which is free of the felt-like material, or after removal of said material, so as to clean the complete drum surface. This will always provide a clean surface for the following panel. Otherwise a coating of binding material would be formed on one surface of the drum, causing imperfect surfaces to be provided on the panel. The formation of such a coating can also be prevented by applying a powder or a suitable liquid, such as silicon oil to the drum surface. The brush can be used to apply said preventatives alone or in combination with spray-nozzles.

It is also within the scope of the present invention, to affix to the shell of the drum, preferably by a shrink-fit, a permanent cover of artificial resin, such as polyvinyl chloride. Such a cover also encloses a longitudinal groove in the drum surface. Such a cover will ensure a high degree of smoothness to the surface of the plaster-fiber panel when removed from the drum equal to the surface smoothness of the artificial resin coating. Such coating or cover can be readily cleaned and retained in an undamaged condition. If the artificial resin cover is damaged, it can be readily and inexpensively replaced. In lieu of a permanent cover or coating for the circumferential surface of the take-up drum, a readily renewable cover of sheet-like material, such as silk-paper or plastic-resin foil may be used.

Referring now to the drawings in detail, there is disclosed a mixing tank 1 (FIG. 1) which is open at the top thereof, funnels 2 and 4 discharging into the open top of the tank. The fibers or fibrous material is supplied to the tank through funnel 2, as indicated by the arrow 3, and the binding material is supplied to the tank through the funnel 4, as indicated by the arrow 5. A pump 6 is connected to the tank, through which a pressurized jet of water is supplied to the tank. The water is pumped from a storage tank 7 through a pipe 8 to which the tank 7 and the pump 6 are connected.

Due to the relatively high pressures at which the water jet emanates from the feed pipe 6, the water mixes quite thoroughly with both the fibrous material and the binding material to form a sludge-like suspension having an excess or surplus water. The solid particles are so evenly distributed in the excess water as to form both a sludge-like suspension which is easy to handle, and a watery fluid.

A stirring device 29 and a wiper or stripper roller 9 are provided within the mixing tank 1. In addition, an endless conveyor belt 11, formed of porous material, passes through the mixing tank and adjacent the stripper 9 with which it cooperates. It will be understood that the belt enters the mixing tank through a suitable water-tight gland or gasket (not shown). Provision is made for a suction or vacuum head 17 over which the belt passes before it leaves the tank. Water-tight gaskets 18—19 extend between suction head 17 and the belt. The action of the suction head 17 causes the watery sludge-like suspension 10 in the tank 1 to be sucked out of the tank and into the adjacent surface of the belt. The belt runs over rollers 12, 13, 14, 15, 16 and 16', in the direction of arrow 11', and is preferably made of a suitable porous textile material. An additional vacuum or suction head 17' is disposed outwardly of the tank in the direction of the travel of the belt and is engaged therewith through the water- and air-tight gaskets 18' and 19', at the bottom of the belt.

Provision is made for a suction pump 20 to provide the desired suction or vacuum action at the heads 17 and 17'. Pump 20 is connected by pipe 21 to both heads. The water is removed by suction from the sludge carried on the belt by the suction heads and passes through pipes 22 and 22' into a common pipe 23 through which it flows, as indicated by arrow 23', to either the storage tank 7 or to the feed pipe 8 which extends to the mixing tank 1 through the pump 6. From the dehydrated sludge on the surface of the belt, there is formed a felt-like layer 10' which moves with the belt over guide roller 13 onto a take-up or wind-up drum 30, a pressure roller 31 cooperating with the drum to wrap the felt-like layer about the drum 30.

As best shown in FIG. 2, the drum 30 comprises a cylindrical shell or casing 48 closed at both ends by circular discs 49 and 50 which are preferably welded thereto. The discs are provided centrally thereof with bearing hubs 51 and 52 through which extends a shaft 48'. The shell 48 is provided in its outer surface with an axial grooves or recess 53. A reinforcing bracket or strut 54 underlies the groove 53. The outer surface of shell 48 is encompassed by a coating 55, preferably formed of artificial resin which is shrunk fit thereon and which extends into the groove 53, as best shown in FIG. 4.

As the belt returns to the tank 1, it is cleansed of any particles remaining from the dehydrated sludge by means of rotary striker 25 which rotates in the direction of the arrow 24. The striker dislodges the particles from the belt and they are washed therefrom by high pressure water sprays or jets directed from the nozzles 26 and 27 onto the belt surface as the belt moves beyond the striker toward the tank 1. A pipe 28 supplies the water to the nozzles 26 and 27, as indicated by the arrow 28'. The cleansed belt returns to the mixing tank to commence a new cycle of operation.

When the felt-like material wound about the drum 30 reaches a desired thickness, it is readily removed therefrom by inserting a knife (not shown) into the groove 53 so as to cut the wound-up material along the extent of the groove. The cut material passes, as a flexible panel 10'' onto a conveyor belt 56. From the conveyor belt it passes over a support or table 58 from which it is directed between cooperating pressure rollers 33 and 34 which press together, as indicated by the arrows 35 and 36. This pressure squeezes out water that is still contained in the flexible panel 10''.

Outwardly of the pressing station constituted by the rollers 33 and 34, provision is made for an additional pressing station constituted by a pressure roller 38 and a cooperating underlying table or support 37. Roller 38 is forced toward table 37, as indicated by the arrow 36. In lieu of a roller and table, the second pressing station can also be constituted by a roller frame having a pair of cooperating rollers. In the same manner, the first pressure station could be constituted by an underlying table and an overlying pressure roller.

The rollers 33, 34 and 38 could be suitably formed to constitute profile-rollers for profiling the outer surfaces of the unfinished panels 10'' so as to facilitate the drying thereof when stacked into a pile. As previously indicated, said rollers may provide surface designs in the panels and the panel surfaces can be suitably treated as they travel between the pressure-applying stations. For example, various surface layers or laminations may be applied to the panels between said stations.

A conventional cutting station, indicated by the arrows 40 and 41 operate to cut the panels to a desired size as they move outwardly of the second pressure-applying station. The cut panels are piled up in a stack 42 mounted on a table or support 43.

A drying chamber 46 is connected through flexible bellows 44 and 45, preferably formed of natural or artificial rubber, to the stack 42. If the panels have been profiled, or if spacers are placed between adjacent panels (not shown) air spaces are provided therebetween. The hot air from chamber 46 can be blown or sucked through the air spaces to accelerate the drying process.

A wheeled platform or cart 47, within the chamber 46, can be moved under the stack on the table 43 and the latter can then be lowered so that the stack can be readily removed from its drying position. Any water removed from the panels 10'' after they leave the drum 30 finds its way into the conduit or pipe 57 through which it is introduced into the pipe 23 for return to the tank 1 by pump 6 via tank 7 and conduit 8.

The following are illustrative examples of mixtures used in practicing the method of the present invention:

*Example 1*

10% to 25% of fibrous material, for example soaked and crushed used paper bags, and 90% to 75% of stucco plaster are mixed with a quantity of water equal to 10 times the weight of the plaster, sufficient keratin is added to the water as a retarder, so that when the surplus water is removed from the sludge, the felt-like resultant material formed by the interlaced fibers and the plaster will set or harden in about 2 hours.

*Example 2*

The same as Example 1, but ⅓ of the stucco plaster by weight is replaced with clay.

With the plaster-fiber felt-like material of the present invention, it is possible to form pipes or tubes. Such pipes will have the same desirable characteristics as panels produced in accordance with the invention.

Various features of the present invention may be used advantageously in the processing of aqueous floats formed of fibrous and aqueous binding material. In this connection, there may be utilized the take-up drum covered with artificial resin, or the use of a sheet of paper, foil or other sheet material to cover the drum.

It is within the scope of the present invention to use other materials in conjunction with aqueous and non-aqueous binders. It is possible to add to the mixture conventional hardening compounds, or to add substances which provide a porous panel for use as a soundproofing panel. A suitable additive for this use is kieselguhr. Other additives may be used to increase the smoothness of the panel surfaces. In addition, resistance against corrosion and moisture may be provided for the finished panels by adding known substances, such as barium hydroxide.

Pursuant to the present invention, there can be produced all sorts of panels and pipes for use on building materials, such as lightweight wall partitions, panels for "dry-plaster" construction, and soundproofing panels. These can be produced by a continuous operation, the water being constantly re-used without any appreciable loss of binder material, and there being no waste as in the prior art molding of plaster panels.

Fibers of any kind may be used, without first being mineralized. Consequently, waste materials, otherwise useless in the production of panels, may be utilized.

Another advantage resides in the fact that the danger of premature setting or hardening is eliminated so that relatively simple apparatus, easy to clean, can be used.

The utilization of excess water provides a composition to the sludge suspension which facilitates the manufacturing and transfer operations.

By reason of all of the foregoing advantages, it is possible to produce high quality plaster building panel materials by inexpensive mass production.

By reason of using excess water before the setting operation and by reason of the removal of most of the water before the final formation of the products, these products are especially hard. The operation is also greatly speeded up due to the removal of water by suction as well as by mechanical compression or squeezing. Consequently, panels produced by the present invention may be shipped after only a few hours of drying time, as compared to cement panels which require 28 days of setting before shipping.

Panels produced according to the present invention are practically unbreakable and have a high tensile strength. For example, a panel produced pursuant to the present invention had a flexure-tensile strength of 104 kg./cm.$^2$ parallel to the direction of production and 117 kg./cm.$^2$ transverse to the direction of production and a ballpressure hardness of 130 kg./cm.² Consequently, panels produced by this invention can be used to support loads over relatively large areas and be self-supporting.

Advantages of prior art plaster building materials are retained, such as low heat conductivity, non-combustibility, fireproof qualities, and manufacture independent of imported raw materials. A lower specific temperature reduces the possibility of vapor condensation or sweating, as in cement panels. The adhesion characteristics for plaster wall or ceiling coating use is better than in the case of cement-setting or plaster-cardboard panels. Products manufactured by the present invention have no brittle plaster layers between the fibers because the fibers are interlaced or intertwined through the smallest plaster crystals to produce a felt-like construction. Furthermore, such panels do not shrink like cement panels and expand very little.

The combination of an aqueous sulphate binder with a material such as plaster of Paris, has the specific advantage of combining the advantages of each of the materials so that the characteristics or properties of the products can be altered by changing the mixture of the binder material.

The binders, the water and the materials adapted to interlace or intertwine in felt-like manner, and other filler material can be mixed together in arbitrary sequence. Therefore it is possible to first mix the binders, then mix them with the fibrous material, and stir said mixture with water provided with a suitable amount of retarder. It is also possible to start with the fiber and fill material into which water containing retarder is mixed and add the binder to said mixture or the mixture of binder material, or the fibrous material can be added to the retarder containing water. Finally all of the various substances can be simultaneously introduced into and mixed in the mixing tank, with the required amount of retarder first added to the water.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A method of continously manufacturing building elements, which comprises preparing a suspension of a fibrous material having fibers capable of interlacing with each other, a settable mineral sulphurous binder material, a large excess of water and a retarding material adapted to retard the setting of said binder material, continuously shaping said suspension into a web-like fleece, continuously removing the major amount of said water from said fleece and allowing said fleece to set.

2. A method of continuously manufacturing building elements, which comprises preparing a suspension of a fibrous material having fibers capable of interlacing with each other, a settable mineral sulphurous binder material, a large excess of water and a retarding material adapted to retard the setting of said binder material, continuously depositing said suspension on a water permeable moving support to continuously form a web-like fleece on said support, continuously applying suction to said support for removing water from said fleece, and allowing said fleece to set.

3. A method of continuously manufacturing building elements, which comprises preparing a suspension of a fibrous material having fibers capable of interlacing with each other, a settable mineral sulphurous binder material and a large excess of water, continuously depositing said suspension on a water-permeable support moving in a generally horizontal direction to form continuously a web-like fleece on said support, continuously applying suction from below said support to remove the major portion of said water from said fleece, allowing said fleece to set and recycling said removed water to said suspension.

4. A method of continuously manufacturing building elements, which comprises preparing a suspension of a fibrous material having fibers capable of interlacing with each other, a settable at least partially dehydrated gypsum-containing binder, a large excess of water and a retarding material for retarding the setting of the gypsum, continuously depositing said suspension on a water-permeable support moving in a generally horizontal direction to form continuously a web-like fleece on said support, continuously applying suction from below said support for continuously removing water from said fleece, and allowing said fleece to set.

5. A method as claimed in claim 4, wherein said retarding material comprises a soluble keratin product, the amount of said soluble keratin product being about 0.1% to 1% by weight calculated on the binder material.

6. A method as claimed in claim 4, wherein said binder comprises ground gypsum cement containing at least 10% of calcuim sulfate, said binder being capable of setting in an air atmosphere.

7. A method as claimed in claim 4, wherein the amount of water constitutes substantially eight to sixteen times the weight of the binder.

8. A method as claimed in claim 4, wherein a binder is used which starts setting after substantially 10 to 500 minutes.

9. A method as claimed in claim 4, wherein a calcium-sulfate containing binder is used which starts setting after 120 to 300 minutes.

10. A method as claimed in claim 4, wherein the fleece, prior to setting, is subjected to a surface improving treatment.

11. A method as claimed in claim 4, wherein said removed water is recycled to the suspension.

12. In a method as claimed in claim 4, wherein said fleece is coated with a finish coating prior to setting.

13. The method set forth in claim 4, further defined in that substantially one-third, by weight, of the binder material is constituted by clay.

References Cited in the file of this patent

UNITED STATES PATENTS

| | | |
|---|---|---|
| 999,474 | Vogelsong | Aug. 1, 1911 |
| 1,532,579 | De Cew | Apr. 7, 1925 |
| 1,765,860 | Clapp | June 24, 1930 |
| 2,222,199 | Fleck | Nov. 19, 1940 |
| 2,304,361 | Hoskins | Dec. 8, 1942 |
| 2,447,161 | Coghill | Aug. 17, 1948 |
| 2,530,986 | Moses | Nov. 21, 1950 |
| 2,718,822 | Magnani | Sept. 27, 1955 |
| 2,838,397 | Gruntfest | June 10, 1958 |

OTHER REFERENCES

Hackh's Chemical Dictionary, Blakiston's Son and Co. Inc., Philadelphia, Pa., 1937, p. 516 relied upon.